Oct. 31, 1939.     W. A. DOUGLAS ET AL     2,178,202
BRACKET
Filed May 24, 1937
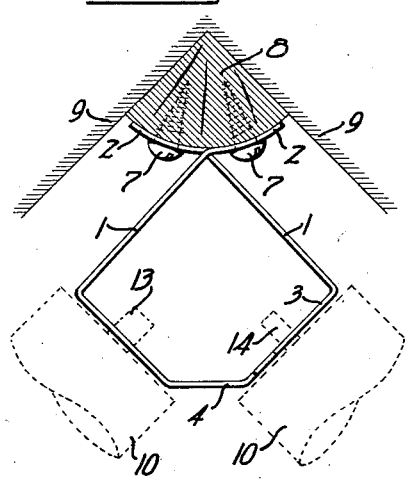
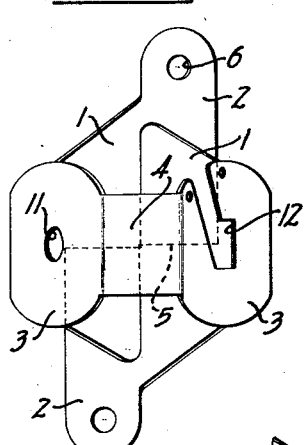
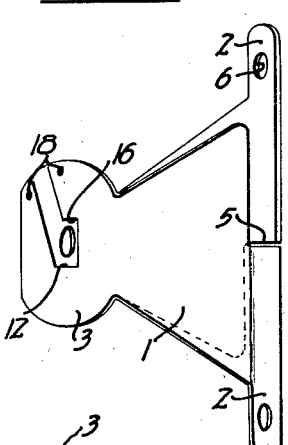
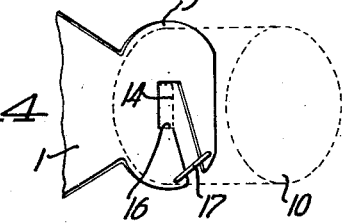
INVENTORS
WARREN A. DOUGLAS
CURTIS BERRY
BY Charles S. Evans
THEIR ATTORNEY Patented Oct. 31, 1939

2,178,202

UNITED STATES PATENT OFFICE 2,178,202

BRACKET

Warren A. Douglas and Curtis Berry, Millbrae, Calif.

Application May 24, 1937, Serial No. 144,462

2 Claims. (Cl. 248—253)

Our invention relates to brackets for mounting window shades.

It is among the objects of our invention to provide a device by which the ends of shade supports may be engaged and supported with the ends in adjacent supports in close proximity.

Another object is to provide a bracket structure which may be readily mounted in corners, or upon narrow supports, for supporting the adjacent ends of two shade supports arranged in disalinement.

A further object is to provide a window shade bracket formed of bendable sheet material to provide arms which may be readily shaped to provide a desired angularity of the supporting arms.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

In the drawing:

Figure 1 is a plan view of one embodiment of the bracket of our invention, as mounted in a corner between two intersecting wall surfaces.

Figures 2 and 3 are front and side elevations respectively of the bracket shown in Figure 1.

Figure 4 is a fragmental view illustrating one manner in which a shade support may be retained on the bracket when mounted in an inverted position.

In terms of broad inclusion, the bracket of our invention comprises a base provided with a pair of outwardly extending arms, having means for engaging the adjacent ends of window shade supports, such as shade rollers, arranged in disalinement upon opposite sides of the bracket. Preferably the bracket is formed from sheet metal with the arms integral with the base. Portions of the bracket are bendable relative to each other, so that the bracket may be shaped to suit the requirements of any particular installation. The bracket is particularly designed for use in installations where the shade supports for adjacent windows must be supported in close proximity to each other, as, for example, in corners where the shades for corner windows must be supported within the angle formed by two intersecting walls; and for metal sash, and similar installations, where the available space is limited.

In terms of greater detail, and with special reference to the preferred embodiment illustrated in Figures 1, 2 and 3 of the drawing, the bracket of our invention comprises a pair of arms 1 having base portions 2 and extensions 3, all integrally formed from a piece of sheet metal bent to the desired form. In this embodiment the arms 1 diverge outwardly from the base portions 2, while the extensions 3 converge from the ends of the arms, and are joined at their outer ends, as at 4.

The base portions 2 are formed upon the inner ends of the arms 1, the end portion of one arm being bent to project laterally in one direction, and having a portion cut away, as at 5, to permit a similar end portion, upon the other arm, to be bent to extend in the opposite direction. The base portions 2 extend above and below the edges of the arms, and are provided with apertures 6 through which securing means, such as screws 7, may be applied. Preferably the base portions are shaped to seat upon a piece of moulding 8 secured within the angle between two intersecting wall surfaces 9. In the absence of a moulding, the base portions 2 may be bent to seat upon any available surface. The arms preferably taper from the base to the extension to obtain increased strength and rigidity.

The base portions 2 and 3 are arranged in angularly disposed relation to the arms 1 such that, when mounted, the extensions 3 will be in position to receive the ends of shade supports 10, extending toward the corner, along the intersecting walls. Suitable means are provided upon the extensions for engaging the shade supports. For example, an aperture 11 may be formed in one extension, and a notch 12 in the other, for engaging the pivot pin 13 and spring key 14 respectively of an ordinary shade roller. For other types of shade supports, engaging means of an appropriate character may, of course, be substituted.

In mounting shade rollers 10, it is not always convenient to mount the rollers with the spring keys of all rollers arranged to extend to the right, as in ordinary practice. Where it is desired to have the key 14 extend to the left, the bracket may be inverted. For that purpose, a relatively wide shoulder 16 is formed inwardly from the open end of the notch 12 to support the key. Retaining means, as for example, a wire or staple 17, is mounted to extend across the open end of the notch 12 for preventing the key from disengaging the bracket during ordinary use. The wire 17 may conveniently be applied through openings 18, formed in the extension 3 upon opposite sides of the notch 12.

We claim:

1. A window shade support comprising a pair of arms arranged in outwardly diverging relation, converging extensions integral with the arms and connected at their outer ends, base portions integral with the inner ends of the arms and angularly disposed with respect thereto, and shade roller engaging means upon the extensions.

2. A window shade support comprising a pair of arms arranged in outwardly diverging relation, converging extensions integral with the arms and connected at their outer ends, base portions integral with the inner ends of the arms and disposed in oppositely extending crossing relation, and shade roller engaging means upon the extensions.

WARREN A. DOUGLAS.
CURTIS BERRY.